US010226867B2

(12) United States Patent
Hiruma et al.

(10) Patent No.: US 10,226,867 B2
(45) Date of Patent: Mar. 12, 2019

(54) ROBOT

(71) Applicant: JANOME SEWING MACHINE CO., LTD., Tokyo (JP)

(72) Inventors: Kenichiro Hiruma, Tachikawa (JP); Yoshikazu Suganuma, Hachioji (JP)

(73) Assignee: JANOME SEWING MACHINE CO., LTD., Tokyo (JP)

( * ) Notice: Subject to any disclaimer, the term of this patent is extended or adjusted under 35 U.S.C. 154(b) by 335 days.

(21) Appl. No.: 15/175,603

(22) Filed: Jun. 7, 2016

(65) Prior Publication Data

US 2016/0361817 A1 Dec. 15, 2016

(30) Foreign Application Priority Data

Jun. 15, 2015 (JP) ................................ 2015-120201

(51) Int. Cl.
*B25J 9/16* (2006.01)
*G05B 19/19* (2006.01)

(52) U.S. Cl.
CPC ............ *B25J 9/1664* (2013.01); *G05B 19/19* (2013.01); *Y10S 901/02* (2013.01); *Y10S 901/41* (2013.01)

(58) Field of Classification Search
CPC .............................. B25J 9/1664; G05B 19/19
See application file for complete search history.

(56) References Cited

U.S. PATENT DOCUMENTS

2009/0307581 A1 12/2009 Jaepel et al.
2016/0101474 A1* 4/2016 Abrahamsen .......... G05B 19/19 700/160
2016/0209833 A1* 7/2016 Distler .................. G05B 15/02
2016/0361818 A1* 12/2016 Hiruma ................. B25J 9/1692

FOREIGN PATENT DOCUMENTS

CA 2906651 A1 9/2014
JP 2014-210332 A 11/2014
JP 2014-226730 A 12/2014

OTHER PUBLICATIONS

Office Action dated Sep. 10, 2016 for corresponding Taiwan patent application No. 105110713, with English tanslation.
Office Action 10 2016 210 097.1 from the German Patent office dated Aug. 15, 2018 and English translation.

* cited by examiner

*Primary Examiner* — Mark A Connolly
(74) *Attorney, Agent, or Firm* — Nath, Goldberg & Meyer; Jerald L. Meyer; Stanley N. Protigal

(57) ABSTRACT

A robot capable of substituting a plurality of parameter candidates in a point by a single-kind instruction sequence in accordance with the point is provided. A robot stores a main program, a sub program referred when the main program is executed, and a plurality of parameters. The sub program contains an instruction sequence containing a variable, and defines control details. The parameters are substitution candidates for the single kind of variable. The parameter to be substituted in the single kind of variable is determined, and one of the memory areas where the parameter is stored is interlinked with the variable in accordance with a determination result.

11 Claims, 13 Drawing Sheets

6

MAIN PROGRAM

| | | 61 POINT STATEMENT | 61 POINT STATEMENT | 61 POINT STATEMENT |
|---|---|---|---|---|
| 62 | POINT NUMBER | #1 | #2 | #3 |
| 63 | POINT KIND INFORMATION | DriveScrew | DriveScrew | DriveScrew |
| 64 | X-AXIS COORDINATE | 100 | 150 | 200 |
| 64 | Y-AXIS COORDINATE | 150 | 200 | 250 |
| 64 | Z-AXIS COORDINATE | 50 | 50 | 50 |
| 65 | PARAMETER NUMBER | 1 | 2 | |

*FIG. 4*

ROBOT

CROSS-REFERENCE TO RELATED APPLICATIONS

This application is based upon and claims the benefit of priority from Japan Patent Application No. 2015-120201, filed on Jun. 15, 2015, the entire contents of which are incorporated herein by reference.

FIELD OF THE INVENTION

The present invention relates to a program that controls a robot.

BACKGROUND

Various industrial robots are becoming popular. Robots are utilized for screw fastening, welding and painting to a work-piece, carriage of the work-piece, attachment of a part to the work-piece, and soldering, etc. Such robots include, for example, a vertical multi-joint type moving unit, and a work tool is attached to the moving unit. A computer that executes a program controls the moving unit and the work tool. Under the control of the computer, the work tool is moved to a predetermined point and actuated.

The program may be described in a point-based robot language. This program includes point statements arranged in sequence, and each point statement is for each point. The point statement contains a point number that is a header, point kind information, and point coordinate information. The point kind information is a so-called function identifier, and identifies an instruction sequence that defines work details to a point, and a moving method thereto.

The robot controls the moving unit and the work tool in accordance with the instruction sequence identified by the point kind information, moves the work tool toward a point indicated by the coordinate information, and executes a work at the point. Parameters indicating operation quantities, such as various distances, various angles, and other various quantities, are necessary for movement to a point and work at that point. For example, a plurality of points is set for a work-piece. Each point is a screw fastening position. A work tool that is an electric screwdriver is positioned above each point at first. Second, the work tool moves down toward the point while turning a screw. A move-down amount is equivalent to a screw length. This move-down amount is given by a parameter specified by the screw length.

It is not always true that screws to be fastened at the point are the same type. Screws which have a different screw length for each point may be fastened. Screws can be classified into, for example, a unique screw to a point, a screw heavily used for the same work-piece, and a screw heavily used regardless of the work-piece. Since the move-down amount of the work-tool toward the point varies depending on the screw length, a variable may be declared every time the point statement is declared, and an appropriate parameter may be substituted in this variable. According to this scheme, however, it is a time-consuming work to initialize the variable every time the point statement is executed.

Hence, when respective system variables interlinked with memory areas storing various screw lengths are prepared beforehand, the user friendliness improves. When, for example, a unique screw to a point is to be fastened, a system variable that is "CondScrewL" corresponding to such a screw length is prepared beforehand. When a screw heavily used in the same work-piece is to be fastened, a system variable that is "ProgScrewL" corresponding to such a screw length is prepared beforehand. When a screw heavily used regardless of the work-piece is to be fastened, a system variable that is "CommongScrewL" corresponding to such a screw length is prepared. Next, the system variable that is "CondScrewL", "ProgScrewL" or "CommongScrewL" is applied in an instruction sequence that defines a moving method and work details.

The instruction sequence to which the system variable "CondScrewL" is applied, the instruction sequence to which the system variable "ProgScrewL" is applied, and the instruction sequence to which the system variable "CommongScrewL" have the common operation that is to fasten a screw. Hence, codes in the instruction sequence other than the system variable are substantially consistent.

However, since the system variable is different, the instruction sequence itself is different. From the standpoint of a programmer who creates an instruction sequence identified by the point kind information, it is a time-consuming work to individually create a plurality of instruction sequences which have only a difference that is the system variable. In addition, such a time-consuming work results in an increase in costs of the robot.

The preset invention has been proposed to address the above technical problems of conventional technologies, and an objective is to provide a robot that enables a substitution of a plurality of parameter candidates in a point by a single-kind instruction sequence in accordance with the point.

SUMMARY OF THE INVENTION

In order to accomplish the above objective, a robot according to an aspect of the present invention includes:

a work tool executing a work on a plurality of points on a work-piece;

a moving unit moving the work tool to the point; and a controller controlling the work tool and the moving unit in accordance with a program, in which:

the controller includes:

a first memory storing a first program, the first program containing statements arranged in sequence for each of the points, the statement containing kind information indicating control details by the controller, and coordinate information on the point;

a second memory storing a second program identified by the kind information, including an instruction sequence containing a variable, and defining the control details;

a third memory storing a plurality of parameters, the parameter being a substitution candidate for a single kind of the variable;

a determining unit determining the parameter to be substituted in the single kind of the variable for each of the statements; and a change unit interlinking again one of memory areas where the parameters are stored with the variable for each of the statements in accordance with a determination result by the determining unit.

Work details for the plurality of points may be consistent except the parameter;

each of the statements may contain the same kind information; and the controller may refer to the same second program when executing each of the statements.

The robot may further include a programming tool creating and editing the first program in accordance with a user manipulation, in which:

the programming tool may be capable of associating the statement with identification information on the parameter in accordance with the user manipulation;

the determining unit may determine whether or not there is the associated identification information; and the change unit may interlink the memory area for the parameter indicated by the identification information with the variable when there is the associated identification information.

The change unit may interlink the memory area for the parameter applied when there is not the identification information with the variable.

One of the plurality of parameters applied when there is not the identification information may be associated with a flag indicating an applicability;

the determining unit may determine whether there is not the identification information and the flag indicates the applicability; and the changing unit may interlink the memory area for the parameter applied when there is not the identification information and the flag indicates the applicability with the variable.

The determining unit may determine whether there is not the identification information and the flag indicates a non-applicability; and the changing unit may interlink the memory area for the parameter applied when there is not the identification information and the flag indicates the non-applicability with the variable.

The work tool may be an electric screw driver fastening a screw with a different screw length for each of the points; and the variable may be contained in the instruction sequence in such a way that the screw length is substituted in the variable.

According to the present invention, since the parameter to be substituted in the variable is determinable from the plurality of candidates, a work to each point is executable by the common instruction sequence even if there are various parameters, facilitating a programmer to create the instruction sequence.

BRIEF DESCRIPTION OF THE DRAWINGS

FIG. 4 is an exemplary diagram illustrating an entire structure of a main program;

DETAILED DESCRIPTION OF THE EMBODIMENTS (Robot Structure)

Figure 1:
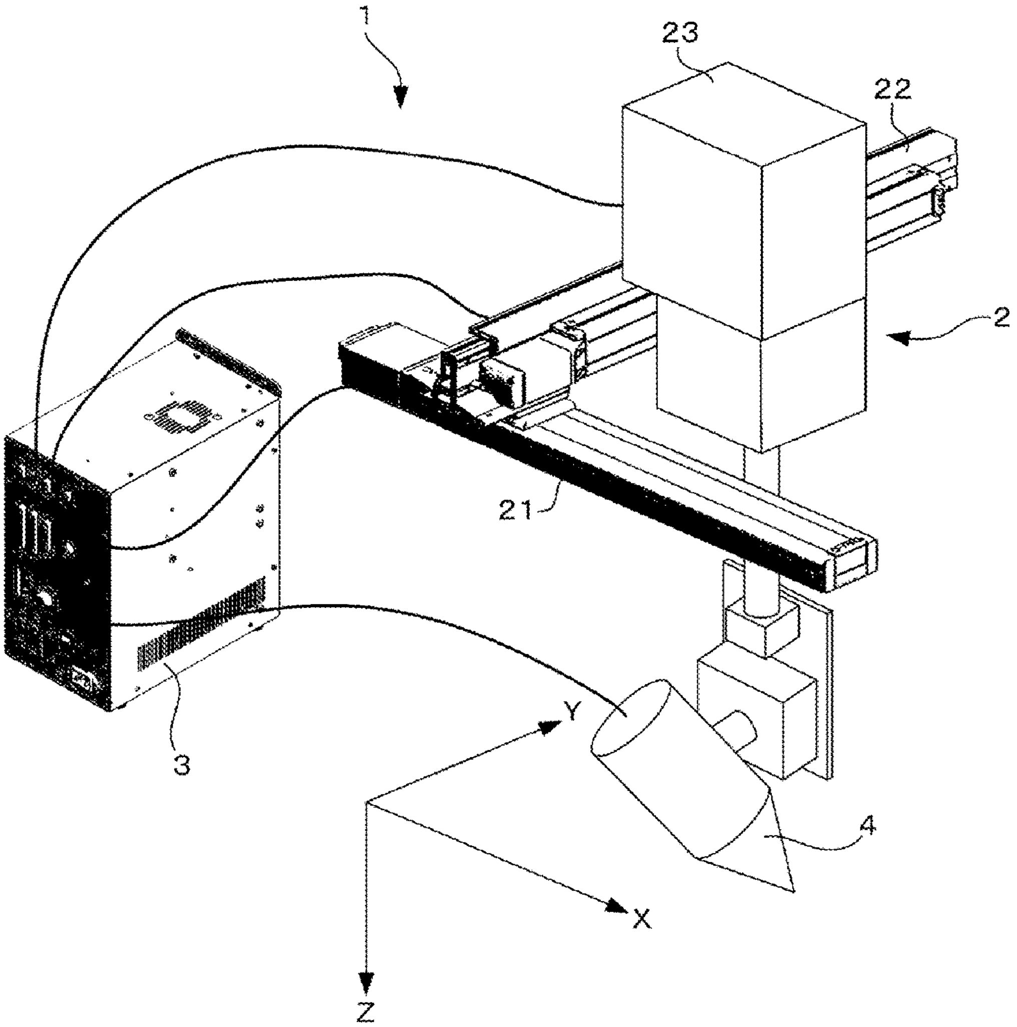
FIG. 1 is an exemplary diagram illustrating an entire structure of a robot.

A robot according to an embodiment of the present invention will be explained below in detail with reference to the accompanying figures. As illustrated in FIG. 1, a robot 1 includes a moving unit 2, and a control unit 3*a*. A work tool 4 is attached to the moving unit 2. The robot 1 positions the work tool 4 at a desired position through the moving unit 2, and actuates the work tool 4. In this embodiment, the work tool 4 is an electric screw driver, and fastens a screw to a work-piece.

The moving unit 2 moves the work tool 4 in an X-axis direction, a Y-axis direction, and a Z-axis direction, and positions the work tool 4 at a specified point. The X-axis direction is a first direction parallel to a plane on which a work-piece is placed. The Y-axis direction is a second direction parallel to the plane and orthogonal to the X-axis direction. The Z-axis direction is a height direction. The moving unit 2 includes an X-linear slider 21 that moves the work tool 4 in the X-axis direction, a Y-linear slider 22 that moves the work tool 4 in the Y-axis direction, and a Z-linear slider 23 that moves the work tool 4 in the Z-axis direction.

The X linear slider 21 has the Y linear slider 22 provided slidably on a rail that extends in the X-axis direction, and has the Y linear slider 22 fastened with an endless belt that runs in the X-axis direction which is orthogonal to the Y linear slider 22. The endless belt is run by an X-axis motor to move the Y linear slider 22 along the X-axis direction.

The Y linear slider 22 has the Z linear slider 23 provided slidably on a rail that extends in the Y-axis direction, and has the Z linear slider 23 fastened with an endless belt that runs in the Y-axis direction. The endless belt is run by a Y-axis motor to move the Z linear slider 23 along the Y-axis direction. Example transmission mechanisms for the X and Y linear sliders 21, 22 are, in addition to endless belts, various actuators including a cylinder and a lead screw.

The Z linear slider 23 includes an arm with an axis that in parallel with the Z-axis direction, and the work tool 4 is attached to the leading end of this arm. This Z linear slider 23 includes, for example, a rack-and-pinion mechanism, has the rack elongated in the Z-axis direction, and has the arm fixed to this rack. The pinion is turned by a Z-axis motor to move the arm in the Z-axis direction. This Z linear slider 23 moves the work tool 4 in the Z-axis direction.

Figure 2:
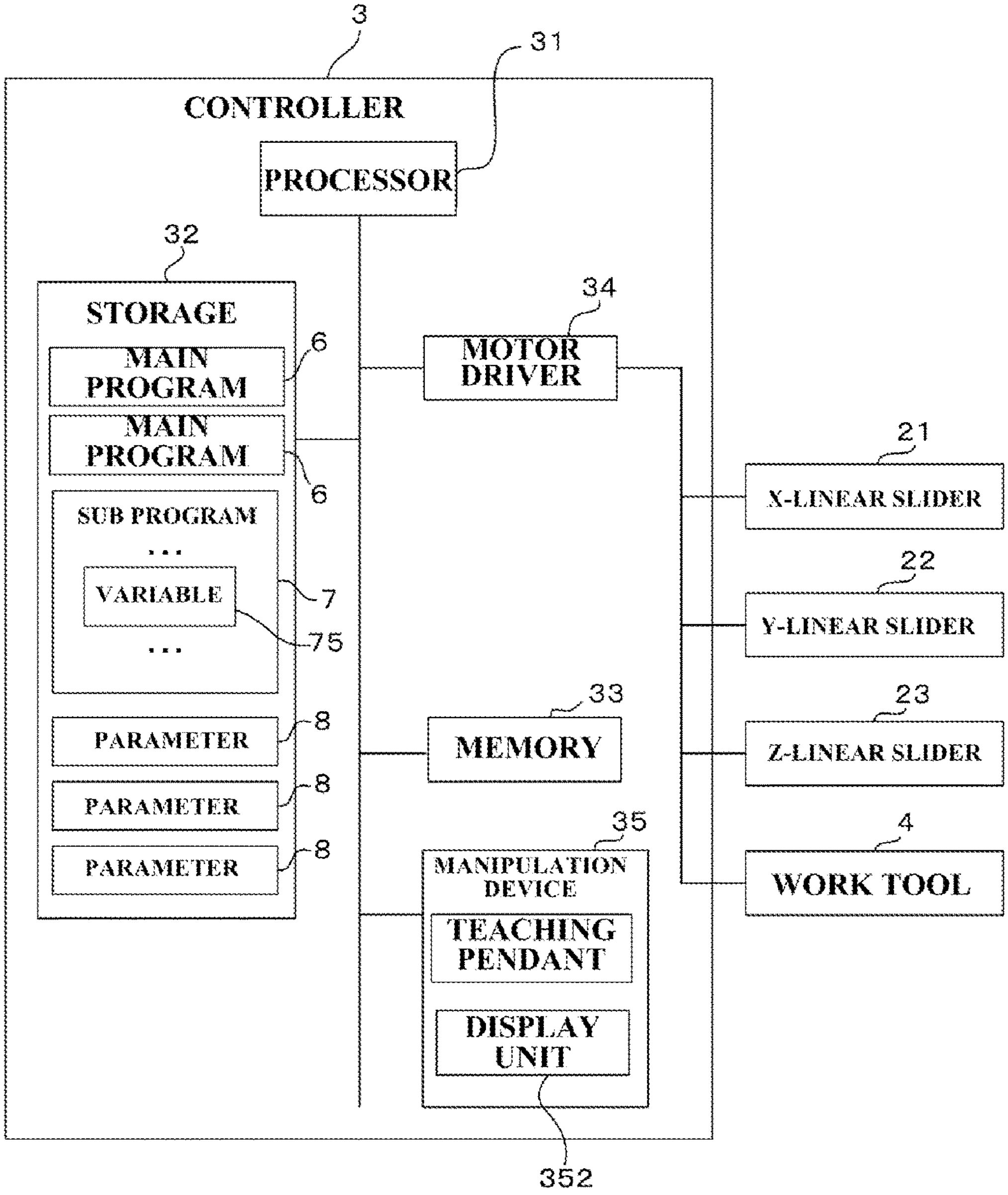
FIG. 2 is a block diagram illustrating a structure of a controller.

As illustrated in FIG. 2, the controller 3 is a so-called computer that includes a processor 31, a storage 32, a memory 33, and peripheral devices. The peripheral devices are a motor driver 34, and a manipulation device 35. The storage 32 stores programs, such as main programs 6, a subprogram 7, and parameters 8. The main program 6 is a main routine, the sub program 7 is a sub routine, and the parameters 8 are substitution candidates to a variable 75 in the sub program 7.

The processor 31 executes a computing process and a control process for the peripheral devices in accordance with the main program 6. The processor 31 refers to the sub program 7 and the parameters 8 as needed when executing the main program 6. The programs are developed in the memory 33 as needed, and computing results by the processor 31 are temporarily stored therein. The motor driver 34 supplies power pulses to respective motors in accordance with an instruction signal that is input from the processor 31 as a result of the control process.

The manipulation device 35 includes a display unit like a liquid crystal display, a mouse, a keyboard, and a teaching pendant. The programs are created and edited through a teaching manipulation using the manipulation device 35. The storage 32 is capable of storing the plurality of main programs 6. The main program 6 to be executed is selected through a manipulation using the manipulation device 35.

Figure 3:
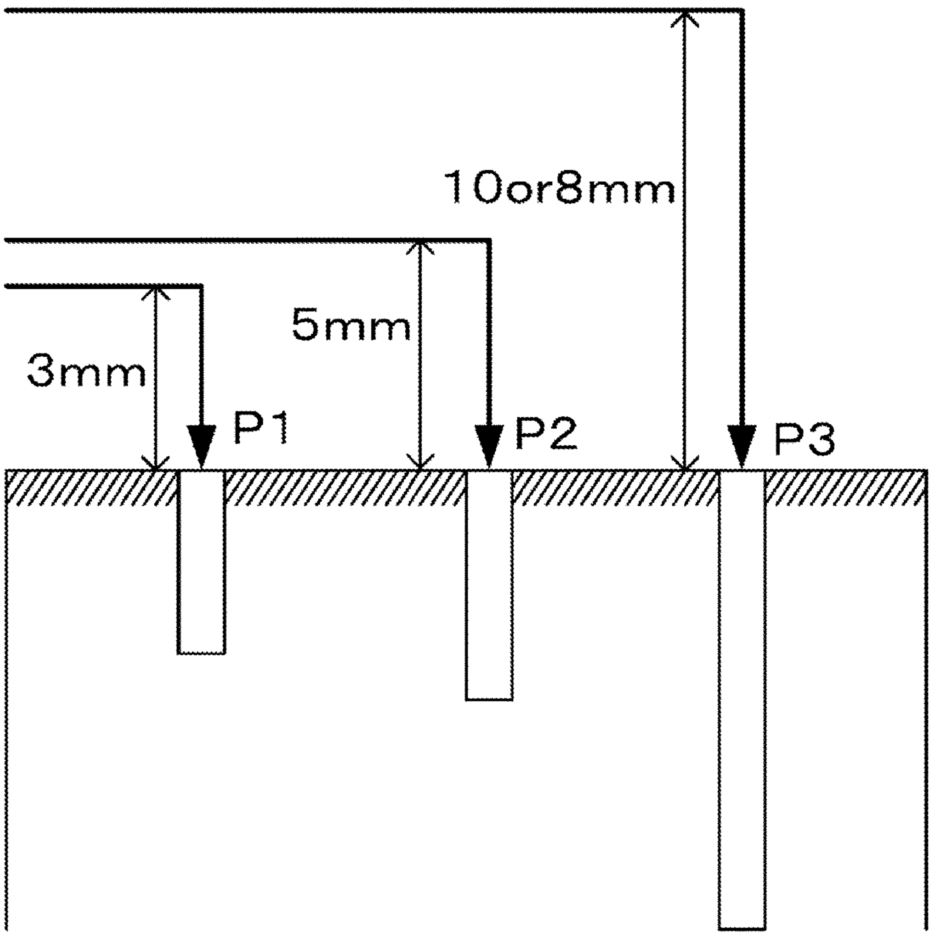
FIG. 3 is an exemplary diagram illustrating an example operation of the robot.

An example operation of the robot 1 according to such programs will be explained. As illustrated in FIG. 3, in the main program 6, points P1, P2, and P3 are set on a work-piece, and the sub program 7 that defines a movement to each point P1, P2, P3, and a screw fastening work is designated. However, a value to be substituted in a variable 75 of the sub program 7 varies depending on the points P1, P2, and P3. A screw that has a unique screw length of 3 mm to the point P1 is to be fastened at this point. A screw that has a unique screw length of 5 mm to the point P2 is to be fastened at this point. A screw which has a screw length of 10 mm and heavily used for this work-piece, or a screw which has a screw length of 8 mm regardless of the work-piece is fastened at the point P3.

The controller 3 positions the work tool 4 right above the points P1, P2, and P3 in this order, and actuates the work tool 4, while at the same time, moving down the work tool 4. However, the controller 3 positions the work tool 4 apart from the point P1 by a height that is 3 mm, and moves down the work tool 4 by the height that is 3 mm. The controller 3 positions the work tool 4 apart from the point P2 by a height that is 5 mm, and moves down the work tool 4 by the height that is 5 mm. The controller 3 positions the work tool 4 apart from the point P3 by a height that is 10 or 8 mm, and moves down the work tool 4 by the height that is 10 or 8 mm.

(Structure of Program)

FIG. 4 is an exemplary diagram illustrating the entire structure of the main program 6. The main program 6 has point statements 61 for respective points P1 to P3 arranged in sequence. The point statement 61 indicates the position of the point, and the control details. In the point statement 61, with a point number 62 being as a header, a point kind information 63, and a point coordinate information 64 are arranged in sequence. Some point statements 61 further have a parameter number 65 arranged in sequence.

The point number 62 clarifies a declaration that the point statement 61 is in a point-based sentence structure, and a delimiter, and, divides each point statement 61. The point coordinate information 64 identifies the position of the point in the coordinate system of the robot 1. For example, respective coordinates of the points P1 to P3 are identified.

The point kind information 63 is a so-called function identifier that indicates the sub program 7 which defines the control details to the point. For example, the point kind information 61 of the sub program 7 that defines a moving method and the work details of screw fastening is arranged in sequence. When defined in the point statement 61, the parameter number 65 identifies a substitution value in the variable 75 declared in the sub program 7. For example, the parameter number 65 identifies a move-down amount of the work tool 4 at the time of screw fastening operation.

Figure 5:
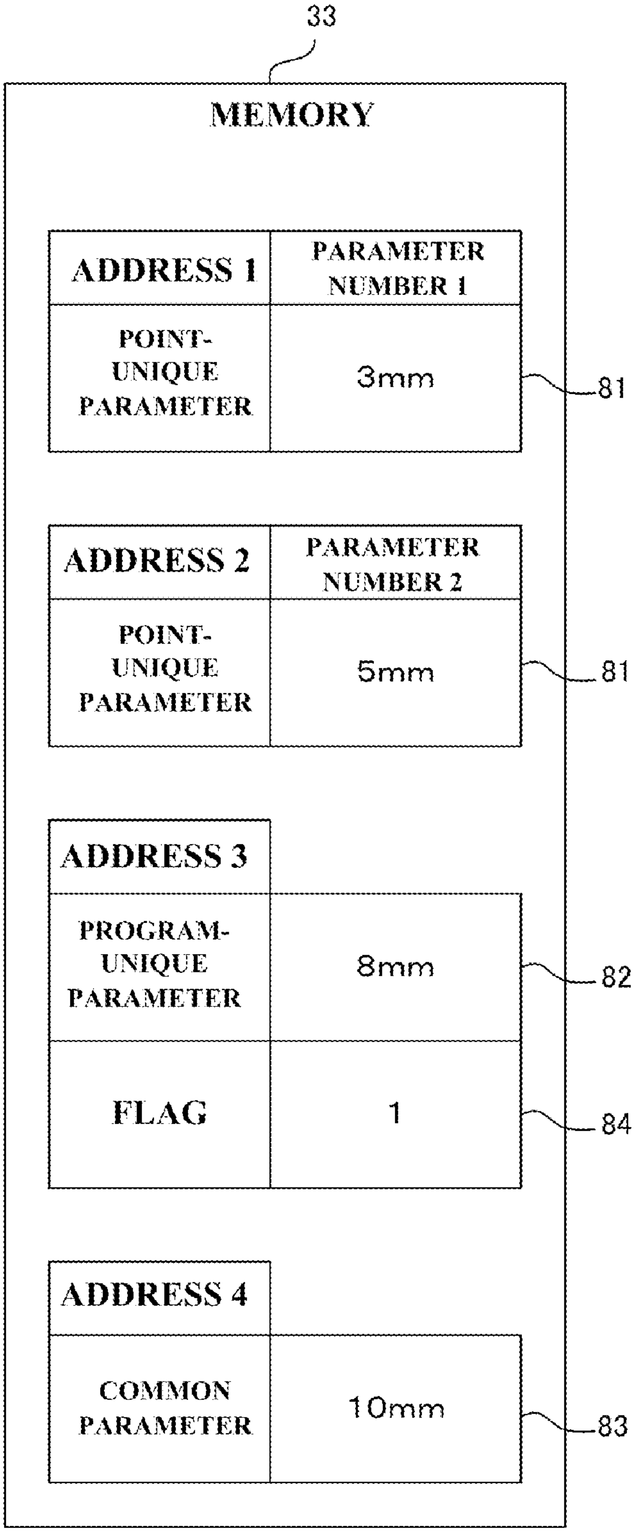
FIG. 5 is an exemplary diagram illustrating an entire structure of a parameter.

FIG. 5 is an exemplary diagram illustrating the entire structure of the parameter 8. The memory 33 stores the plurality of parameters 8 that are substitution candidates to the variable 75 in the sub program 7. That is, the memory 33 stores plural kinds of point-unique parameters 81 identified by the parameter numbers 65, a program-unique parameter 82 common to the single main program 6, and a common parameter 83 to be applied regardless of the main program 6. The program-unique parameter 82 has a flag 84 associated therewith. This flag 84 indicates whether or not the associated program-unique parameter 82 is to be applied. The details in the flag 84 are re-written by a manipulation using the manipulation device 35.

Figure 6:
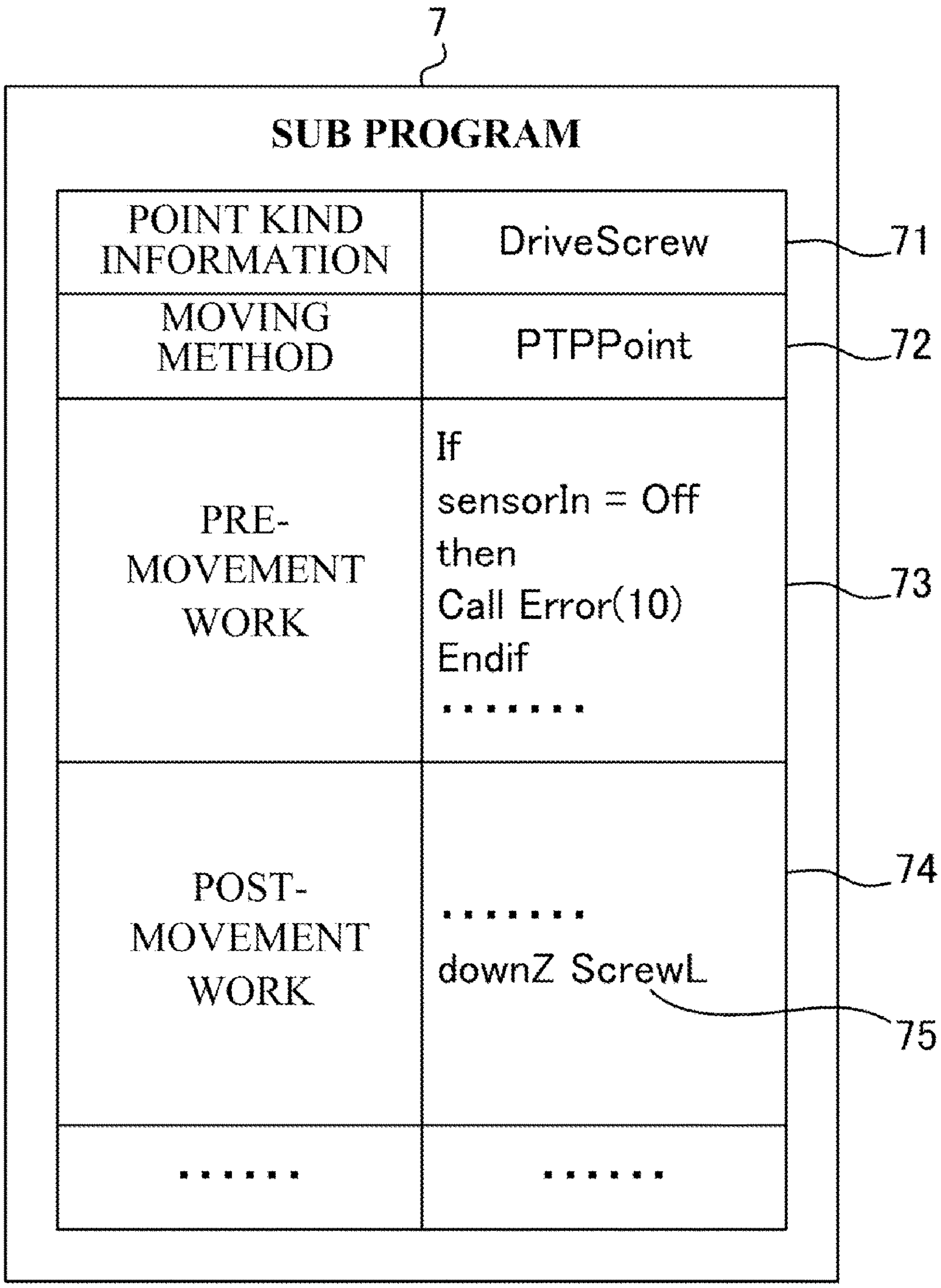
FIG. 6 is an exemplary diagram illustrating an entire structure of a sub program.

FIG. 6 is an exemplary diagram illustrating the entire structure of the sub program 7. The sub program 7 is identified by the point kind information 71 that is a so-called function identifier. In the sub program 7, a moving-method instruction sequence 72, a pre-movement work instruction sequence 73, and a post-movement work instruction sequence 74 are described. The moving-method instruction sequence 72 is a bundle of statements to control a moving method to the point. For example, the moving-method instruction sequence 72 indicates a PTP movement, etc., that moves the work tool 4 linearly so as to interconnect the adjoining points. The moving-method instruction sequence 72 may be a function identifier of an external function defined beforehand.

The pre-movement work instruction sequence 73 is a bundle of statements to be executed prior to the movement to the point. For example, the pre-movement work instruction sequence 73 is described with an operation of holding a screw. The post-movement work instruction sequence 74 is a bundle of statements to be executed after the movement to the point. For example, the post-movement work instruction sequence 74 is described with an operation of moving down the work tool 4 while actuating the work tool 4. The subprogram 7 contains the variable 75. For example, in order to move down the work tool 4 toward the point, the post-movement work instruction sequence 74 is described with a set of move-down instruction and move-down variable.

Figure 7:
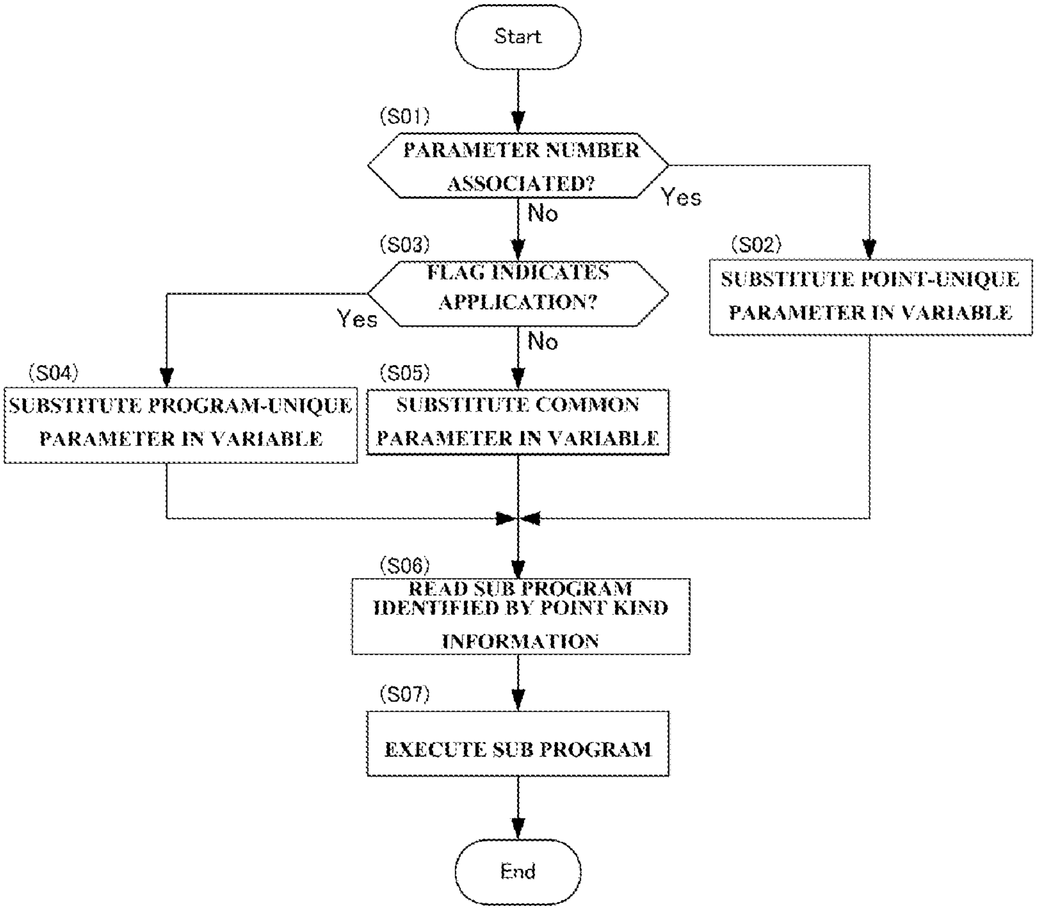
FIG. 7 is a flowchart illustrating an execution operation of programs by the controller.

An explanation will be given of an execution operation of those programs. FIG. 7 is a flowchart illustrating a process of the main program 6 by the controller 3. The controller 3 determines (step S01) whether or not the point statement 61 that has the point number 62 which is N is associated with the parameter number 65. The initial value of N is 1. When the point statement 61 is associated with the parameter number 65 (step S01: YES), the point-unique parameter 81 identified by the parameter number 65 is substituted (step S02) in the variable 75.

When the point statement 61 is not associated with the parameter number 65 (step S01: NO), the controller 3 checks (step S03) the flag 84. When the flag 84 has a value that is 1, i.e., is the value indicating that the program-unique parameter 82 is to be applied (step S03: YES), the controller 3 substitutes (step S04) the program-unique parameter 82 in the variable 75.

When the flag 84 has a value that is zero, i.e., the value indicating that the program-unique parameter 82 is not to be applied (step S03: NO), the controller 3 substitutes (step S05) the common parameter 83 in the variable 75.

After completion of the substitution in the variable 75, the controller 3 calls out (step S06) the sub program 7 identified by the same point identification information 71 as the point kind information 63 arranged in the N-th point statement 61, and executes (step S07) this sub program 7. After completion of the execution of the sub program 7, the process returns to the main program 6, and the process starting from the step S01 is repeated for the next point statement 61.

As explained above, as illustrated in FIG. 8, the controller 3 functions as a control unit 3*a* for the robot 1, a determining unit 3*b* that determines the parameter 8 for the variable 75, and a change unit 3*c* that changes the details in the variable 75 to the determined parameter 8. The determining unit 3*b* determines the presence or absence of the parameter number 65 in each point statement 61, and the details of the flag 84 associated with the program-unique parameter 82. The change unit 3*c* interlinks the variable 75 with a memory area where the point-unique parameter 81, the program-unique parameter 82, or the common parameter 83 is stored in accordance with the determination result by the determining unit 3*b*.

Figure 8:
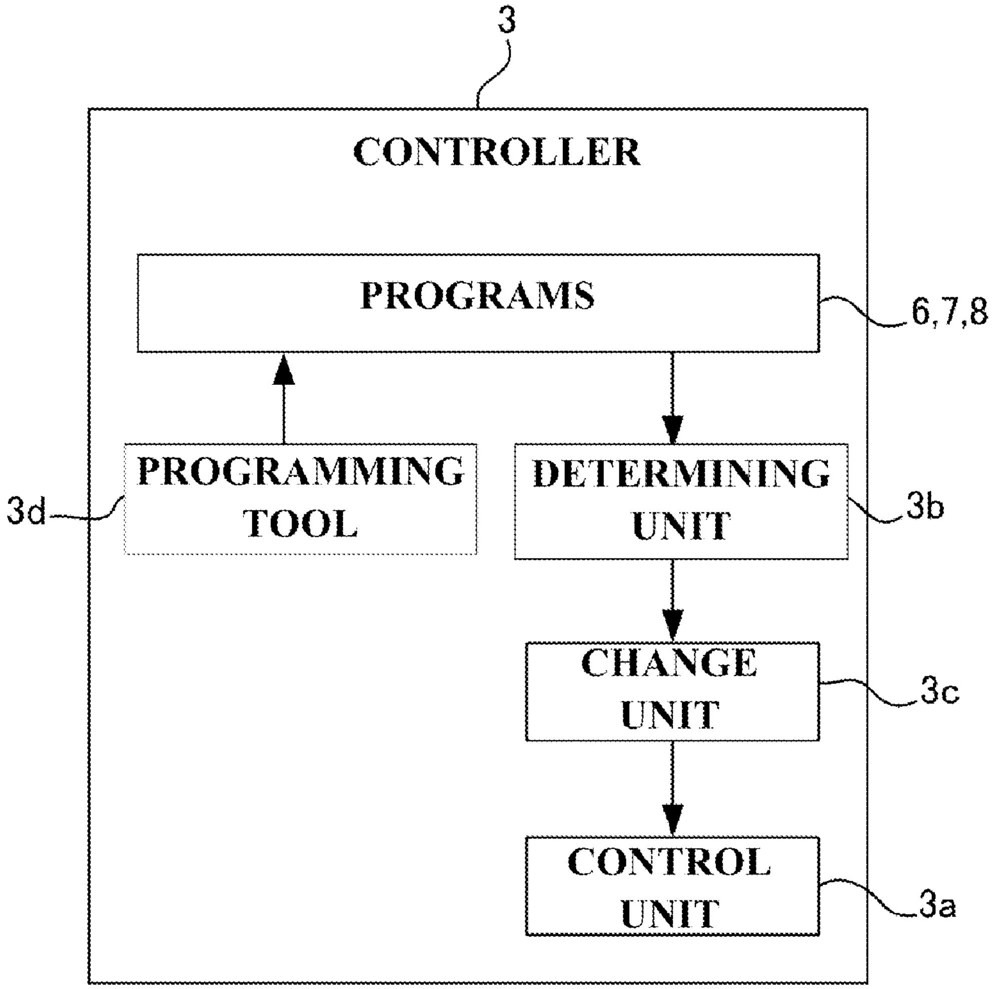
FIG. 8 is a block diagram illustrating a function of the controller.

As illustrated in FIG. 8, the controller 3 further functions as a programming tool 3*d*, and newly creates and edits the programs in response to an input given to the manipulation device 35. When the programs are created and edited, the programming tool 3*d* displays the details of the main program 6 on the display unit, and associates the parameter number 65 with the point statement 61 in response to an input given to the manipulation device 35.

Figure 9:
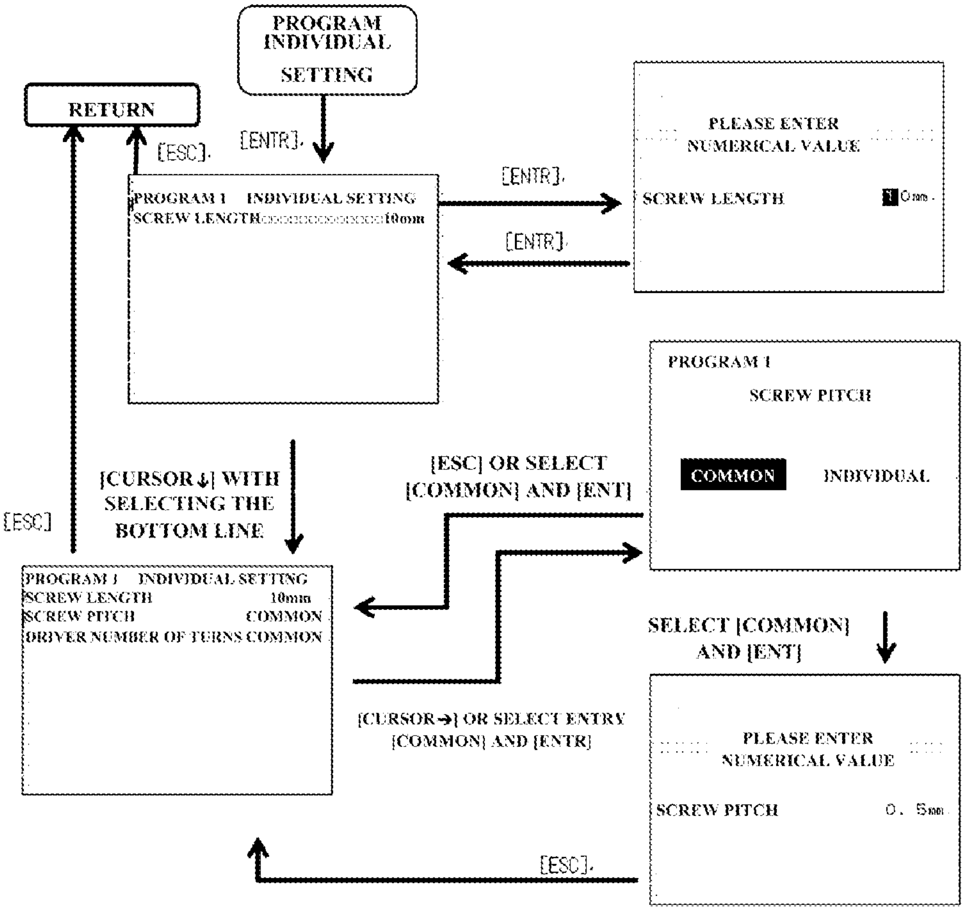
FIG. 9 is an exemplary diagram illustrating a transition in parameter setting screen by a programming tool.

In addition, as illustrated in FIG. 9, a parameter setting screen for the main program 6 is displayed. In the parameter setting screen, a selection is made for whether the program-unique parameter 82 or the common parameter 83 is substituted in the variable 75 in the point statement 61 that has no parameter number 65. In accordance with the selection through the manipulation device 35, the programming tool 3*d* re-writes the details of the flag 84. In addition, in this parameter setting screen, the point-unique parameter 81, the program-unique parameter 82, and the common parameter 83 are set up. The programming tool 3*d* stores the lower limit value and the upper limit value in each parameter 8, and when the input parameter 8 is lower than the lower limit value or exceeds the upper limit value, an error notification is given.

(Action)

Figure 10:
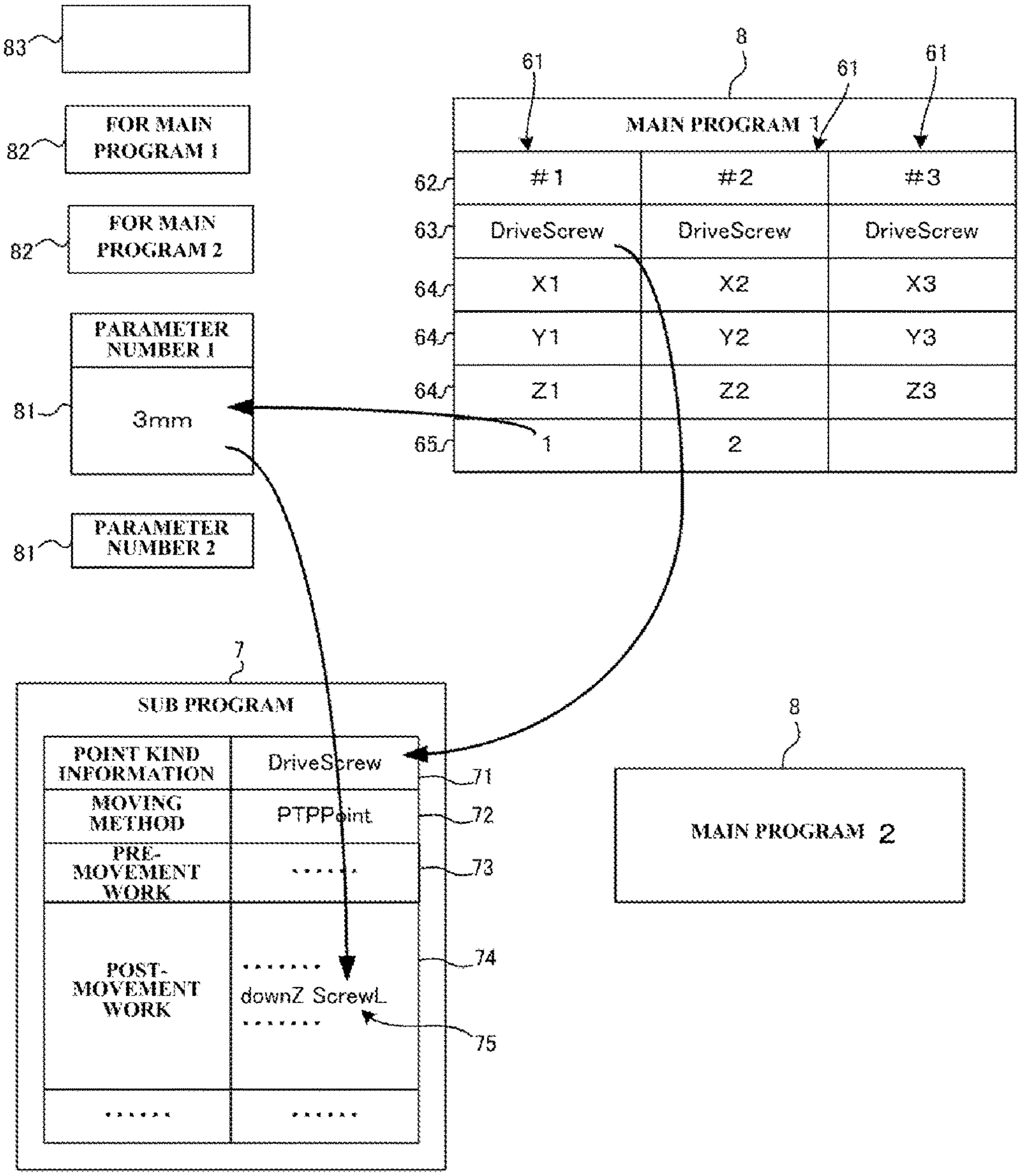
FIG. 10 is an exemplary diagram illustrating a first example execution of a point statement.

As illustrated in FIG. 10, for example, the first point statement 61 arranged in sequence in the main program 6 indicates "#1 screw fastening point X=X1, Y=Y1, Z=Z1 parameter number 1". In addition, in the address of the memory 33 identified by "parameter number 1", a value that is 3 mm is stored.

First, the controller 3 identifies the delimiter of the point statement 61 based on the point number 62 that is "190 1". The controller 3 executes an initialization of substituting X1, Y1, and Z1 in an X-coordinate variable X, a Y-coordinate variable Y, and a Z-coordinate variable Z, respectively. In addition, since the parameter number 65 that is "parameter number 1" is associated, the controller 3 executes an initialization of substituting the value identified by "parameter number 1" that is 3 mm in the variable 75 that is "ScrewL" declared as the screw length.

Next, the moving unit 2 and the work tool 4 are controlled in accordance with the sub program 7 that has the same point kind information 71 as the point kind information 63 that is "screw fastening point". The sub program 7 contains a block of instruction sequences to move and actuate the work tool 4.

One of the blocks of instruction sequences is the moving-method instruction sequence 72, and is described with a function identifier that is "PTPpoint" for a PTP movement.

An external function of "PTPpoint" contains the variable 75 for "ScrewL" which is "Move X Y Z+ScrewL". In addition, one of the blocks of instruction sequences is the post-movement work instruction sequence 74, and the post-movement work instruction sequence 74 is described with a set of function identifier "downZ" and the variable 75 that is "ScrewL".

First, the controller 3 moves the work tool 4 by PTP movement to a position (X, Y, Z)=(X1, Y1, Z1+3) so as to match the value that is the height of 3 mm indicated by the variable 75 of ScrewL in response to a Move instruction. Next, the controller 3 moves down the work tool 4 by an amount indicated by the value of the variable 75 of ScrewL which is 3 mm in response to a downZ instruction while actuating the work tool 4.

Figure 11:
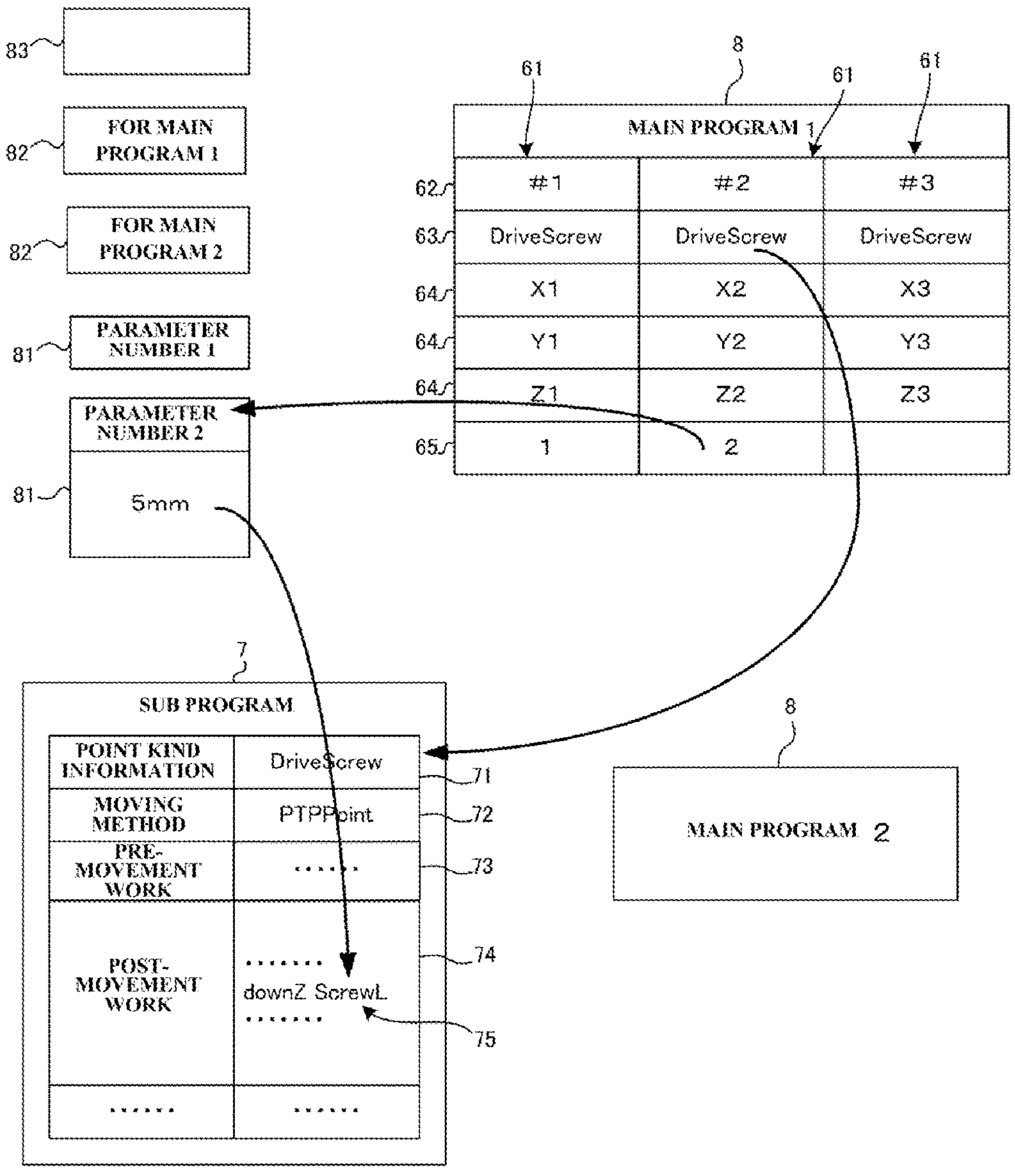
FIG. 11 is an exemplary diagram illustrating a second example execution of a point statement.

As illustrated in FIG. 11, for example, the second point statement 61 arranged in sequence in the main program 6 indicates "#2 screw fastening point X=X2 Y=Y2 Z=Z2 parameter number 2". In the address of the memory 33 identified by "parameter number 2", a value that is 5 mm is stored.

First, the controller 3 identifies the delimiter of the point statement 61 based on the point number 62 that is "#2". The controller 3 executes an initialization of substituting X2, Y2, and Z2 in the X-coordinate variable X, the Y-coordinate variable Y, and the Z-coordinate variable Z, respectively. In addition, since the parameter number 65 that is "parameter number 2" is associated, the controller 3 executes an initialization of substituting the value identified by "parameter number 2" that is 5 mm in the variable 75 that is "ScrewL" declared as the screw length.

Next, the moving unit 2 and the work tool 4 are controlled in accordance with the same sub program 7 as that of the point statement 61 for "#1" which is "screw fastening point". That is, one of the blocks of instruction sequences is the moving-method instruction sequence 72, and is described with the function identifier for a "PTP movement". An external function of "PTP movement" contains the variable 75 for "ScrewL" which is "Move X Y Z+ScrewL". In addition, one of the blocks of instruction sequences is the post-movement work instruction sequence 74, and the post-movement work instruction sequence 74 is described with a set of function identifier "downZ" and the variable 75 that is "ScrewL".

After the fastening of the first screw completes, the controller 3 moves the work tool 4 by PTP movement to a position (X, Y, Z)=(X2, Y2, Z2+5) so as to match the value that is the height of 5 mm indicated by the variable 75 of ScrewL in response to a Move instruction. Next, the controller 3 moves down the work tool 4 by an amount indicated by the value of the variable 75 of ScrewL which is 5 mm in response to a downZ instruction while actuating the work tool 4.

Figure 12:
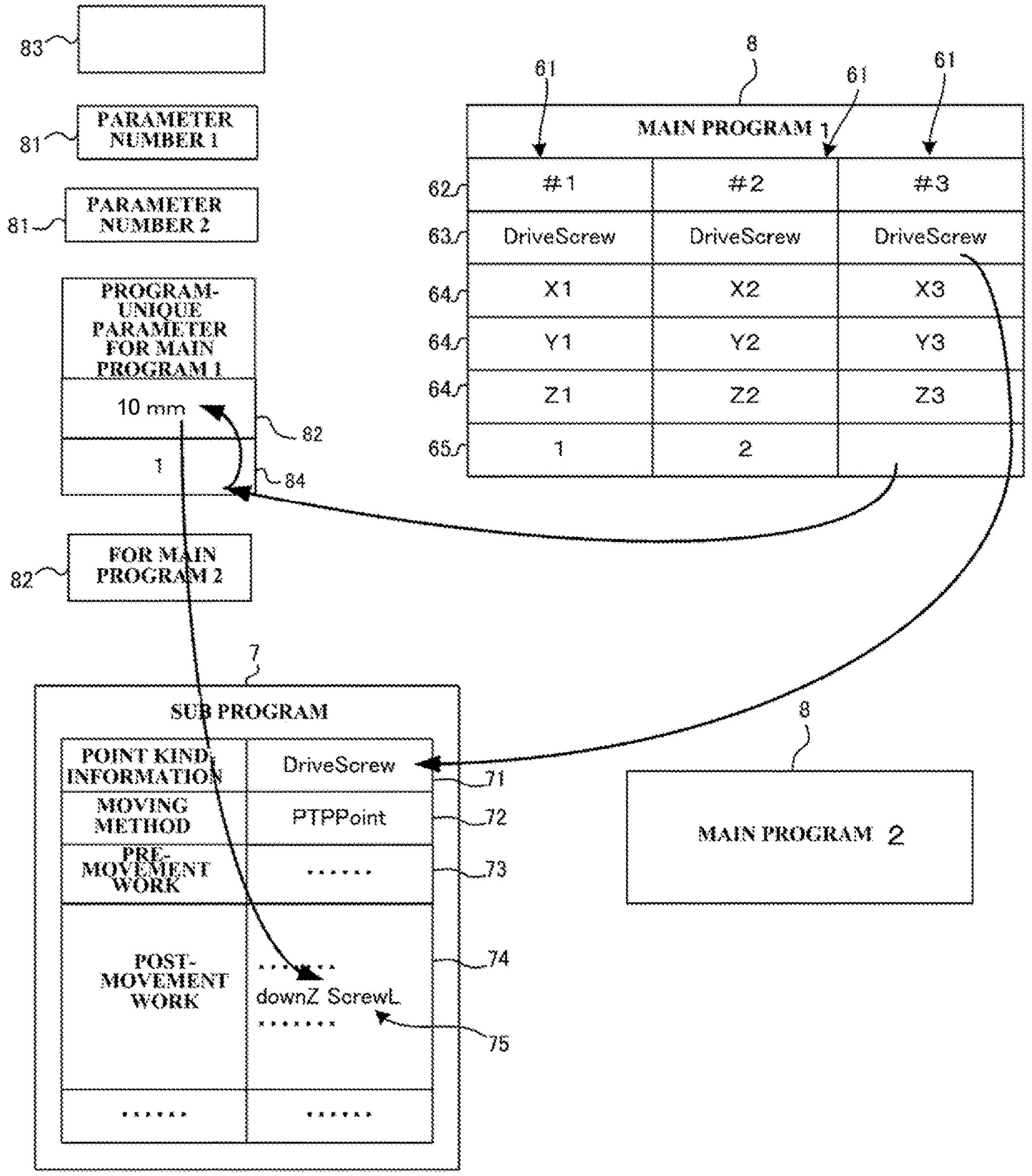
FIG. 12 is an exemplary diagram illustrating a third example execution of a point statement.

As illustrated in FIG. 12, for example, the third point statement 61 arranged in sequence in the main program 6 indicates "#3 screw fastening point X=X3 Y=Y3 Z=Z3". In addition, the flag 84 is "1" indicating applicability. In the address of the memory 33 secured as an area for the program-unique parameter 82, a value that is 10 mm is stored.

First, the controller 3 identifies the delimiter of the point statement 61 based on the point number 62 that is "#3". The controller 3 executes an initialization of substituting X3, Y3, and Z3 in the X-coordinate variable X, the Y-coordinate variable Y, and the Z-coordinate variable Z, respectively. In addition, since no parameter number 65 is associated, and the flag 84 is "1", the controller 3 executes an initialization of substituting the value identified by the program-unique parameter 82 that is 10 mm in the variable 75 that is "ScrewL" declared as the screw length.

Next, the moving unit 2 and the work tool 4 are controlled in accordance with the same sub program 7 as those of the point statements 61 for "#1" and "#2" which are "screw fastening point". That is, after the fastening of the second screw completes, the controller 3 moves the work tool 4 by PTP movement to a position (X, Y, Z)=(X3, Y3, Z3+10) so as to correspond to the height indicated by the value of 10 mm indicated by the variable 75 of ScrewL in response to a Move instruction. Next, the controller 3 moves down the work tool 4 by an amount indicated by the value of the variable 75 of ScrewL, which is 10 mm in response to a downZ instruction while actuating the work tool 4.

Figure 13:
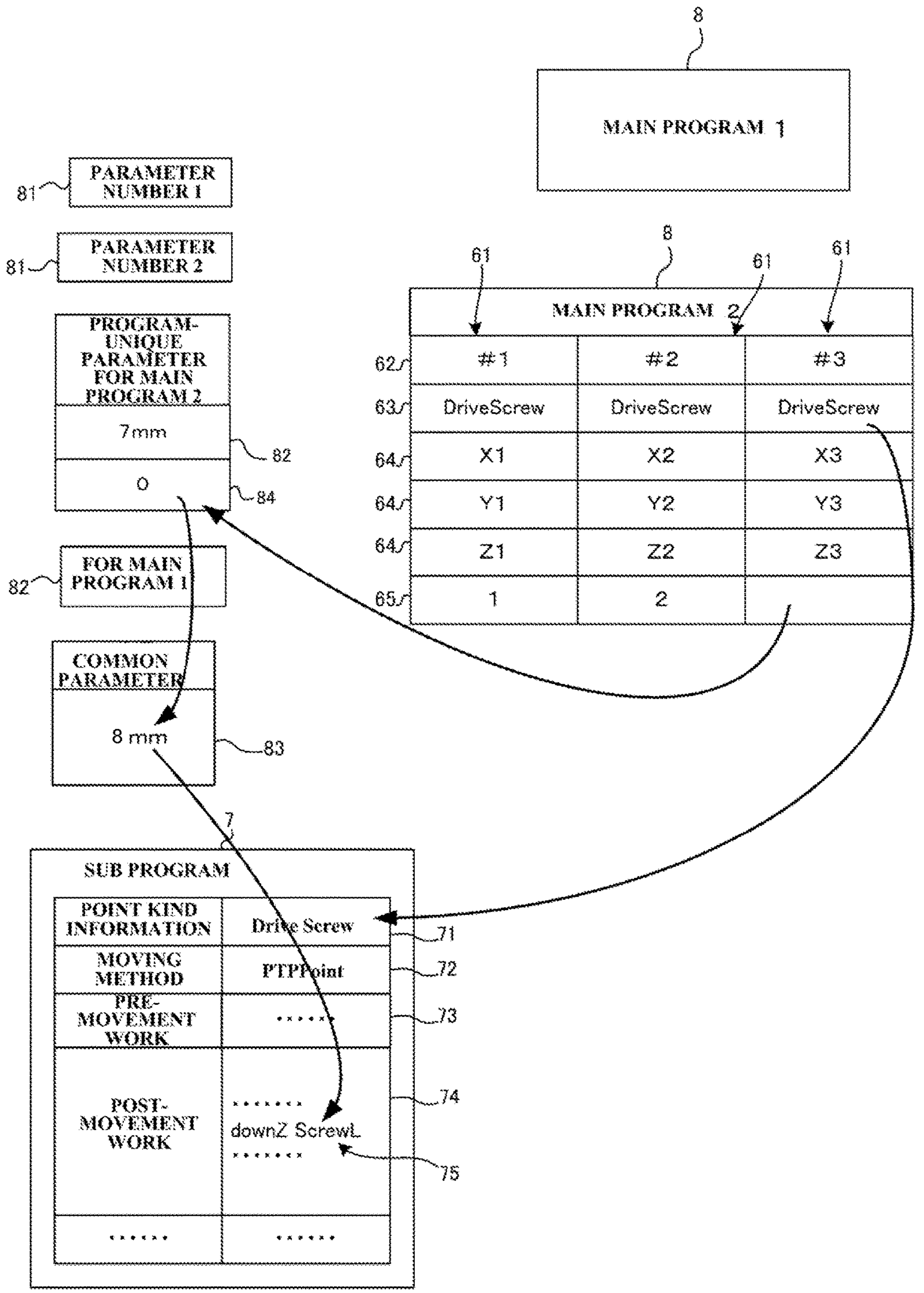
FIG. 13 is an exemplary diagram illustrating a fourth example execution of a point statement.

As illustrated in FIG. 13, for example, the third point statement 61 arranged in another main program 8 indicates "#3 screw fastening point X=X3 Y=Y3 Z=Z3". In addition, the flag 84 is "zero" indicating inapplicability. In the address of the memory 33 secured as an area for the common parameter 83, a value that is 8 mm is stored.

Since no parameter number 65 is associated and the flag 84 is "zero", the controller 3 executes an initialization of substituting a value that is 8 mm identified by the common parameter 83 in the variable 75 of "ScrewL" declared as the screw length.

Next, the moving unit 2 and the work tool 4 are controlled in accordance with the same sub program 7 as those of the point statements 61 for "#1" and "#2" which are "screw fastening point". That is, after the fastening of the second screw completes, the controller 3 moves the work tool 4 by PTP movement to a position (X, Y, Z)=(X3, Y3, Z3+8) so as to correspond to the height indicated by the value of 8 mm indicated by the variable 75 of ScrewL, in response to a Move instruction. Next, the controller 3 moves down the work tool 4 by an amount indicated by the value of the variable 75 of ScrewL which is 8 mm in response to a downZ instruction while actuating the work tool 4.

As explained above, according to the robot 1 of this embodiment, the declaration of the variable 75 is not to secure the area in the memory 33. In addition, no variable 75 that has a different variable name to substitute each parameter 8 is prepared, and no parameter 8 for the variable 75 is changed. Plural kinds of candidates that are the point-unique parameter 81, the program-unique parameter 82, and the common parameter 83 are stored in the memory 33 in advance, and the memory area of the parameter 8 for the variable 75 is selectively changed.

Hence, it is sufficient if a single kind of sub program 7 which has different parameters 8 to be utilized but which defines the same process details is prepared. That is, unlike the conventional technologies, when screws that have screw lengths of 3 mm, 8 mm and 10 mm are to be fastened to the same work-piece, it is unnecessary to prepare different subprograms 7 that are the subprogram 7 which has the variable 75 that is, for example, "condScrewL" declaring the area where the value 3 mm is stored, and which has the consistent remaining described details, the sub program 7 which has the variable 75 that is, for example, "ProgScrewL" declaring the area where the value 8 mm is stored, and which has the consistent remaining described details, and the sub program 7 which has the variable 75 that is, for example, "CommongScrewL" declaring the area where the value 10 mm is stored, and which has the consistent remaining described details.

According to the robot 1 of this embodiment, even if screws which have the screw lengths of 3 mm, 8 mm and 10 mm are to be fastened to the same work-piece, it is sufficient if a single sub program 7 that contains the variable 75 that is, for example, "ScrewL".

(Effect)

As explained above, this robot 1 stores the main program 6 which contains the point statements 61 arranged in sequence point by point, and the point statement 61 contains the point kind information 63 and the point coordinate information 64 that indicate the control details on the moving unit 2 and the work tool 4 by the controller 3. In addition, the robot 1 stores the sub program 7 which is identified by the point kind information 71, includes the instruction sequence containing the variable 75, and defines the control details. Still further, the robot 1 stores the plurality of parameters 8 that are substitution candidates in a single kind of variable 75.

The parameter 8 to be substituted in the single kind of variable 75 is determined for each point statement 61, and one of the memory areas where the parameter 8 is stored is interlinked again with the variable 75 for each point statement 61 in accordance with the determination result.

This enables a substitution of the different parameter 8 in the single kind of variable 75 in accordance with the determination result, and thus it becomes unnecessary to prepare respective programs that declare the different variables 75 because of the difference in parameter 8. That is, it is sufficient if a single program with the same work details is prepared even if the parameter 8 is different. Hence, a time for creating the program is reduced, thereby reducing the manufacturing costs of the robot 1.

Hence, when the work details for the plurality of points are consistent except the parameter, it is appropriate if the same point kind information 63 is selected for each point statement 61, and the controller 3 refers to the same sub program 7 when executing each point statement 61. This enables the user who gives a teaching manipulation to the robot 1 to eliminate a selection manipulation of the sub program 7 applied in accordance with the parameter 8 to be applied, thereby reducing a labor effort.

In this embodiment, the explanation has been given of an example case in which the variable 75 is the screw length, and is contained in the moving-method instruction sequence 72 and the post-movement instruction sequence 74. However, the present invention is not limited to this example case, and is applicable to various variables 75, such as a screw pitch and a number of turns of the electric screw driver. In addition, in this embodiment, the explanation has been given of an example case in which the work tool 4 is the electric screwdriver for screw fastening, but various work tools, such as a welder, a paint gun, a paint needle, a soldering iron, and a handler, are applicable, and the variable 75 contained in the subprogram 7 is changeable in accordance with the work details are applicable to the present invention.

(Other Embodiments)

An embodiment of the present invention has been explained above, but various omissions, replacements, and modifications can be made thereto without departing from the scope of the present invention. Such embodiments and modified examples thereof are within the scope of the present invention, and are also within the invention as recited in the appended claims and the equivalent range thereto.

For example, the explanation has been given of an example case in which the programming for the robot 1 is directly given to the robot 1, but the present invention is not limited to this example case, and for example, the programming may be performed by the programming tool 3*d* that is, for example, a different computer from the robot 1, and the programs may be loaded in the robot 1.

What is claimed is:

1. A robot comprising:

a work tool executing a work on a plurality of points on a work-piece;

a moving mechanism moving the work tool to the point; and a controller controlling the work tool and the moving mechanism in accordance with a program, wherein:

the controller comprises:

a processor;

a first memory storing a first program, the first program containing statements arranged in sequence for each of the points, the statement containing kind information indicating control details by the controller, and coordinate information on the plurality of points;

a second memory storing a second program, the second program identified by the kind information, comprising an instruction sequence containing a variable, and defining the control details; and a third memory storing a plurality of parameters, the plurality of parameters being a substitution candidate for a single kind of the variable;

wherein the controller determines the plurality of parameters to be substituted in the single kind of the variable for each of the statements, and interlinks one of memory areas where the parameters are stored with the variable for each of the statements in accordance with a determination result.

2. The robot according to claim 1, wherein:

work details for the plurality of points are consistent except the plurality of parameters;

each of the statements contains the same kind information; and the controller refers to the same second program when executing each of the statements.

3. The robot according to claim 2, further comprising a programming tool creating and editing the first program in accordance with a user manipulation, wherein:

the programming tool is capable of associating the statement with identification information of the plurality of parameters in accordance with the user manipulation; and the controller determines whether or not there is the associated identification information, and interlinks the memory area for the plurality of parameters indicated by the identification information with the variable when there is the associated identification information.

4. The robot according to claim 3, wherein the controller interlinks the memory area for the plurality of parameters applied when there is not the identification information with the variable.

5. The robot according to claim 4, wherein:

one of the plurality of parameters applied when there is not the identification information is associated with a flag indicating an applicability; and the controller determines whether there is not the identification information and the flag indicates the applicability, and interlinks the memory area for the parameter applied when there is not the identification information and the flag indicates the applicability with the variable.

6. The robot according to claim 5, wherein:

the controller determines whether there is not the identification information and the flag indicates a non-applicability, and interlinks the memory area for the parameter applied when there is not the identification information and the flag indicates the non-applicability with the variable.

7. The robot according to claim 1, further comprising a programming tool creating and editing the first program in accordance with a user manipulation, wherein:

the programming tool is capable of associating the statement with identification information of the plurality of parameters in accordance with the user manipulation; and the controller determines whether or not there is the associated identification information, and interlinks the memory area for the plurality of parameters indicated by the identification information with the variable when there is the associated identification information.

8. The robot according to claim 7, wherein the controller interlinks the memory area for the plurality of parameters applied when there is not the identification information with the variable.

9. The robot according to claim 8, wherein:

one of the plurality of parameters applied when there is not the identification information is associated with a flag indicating an applicability; and the controller determines whether there is not the identification information and the flag indicates the applicability, and interlinks the memory area for the parameter applied when there is not the identification information and the flag indicates the applicability with the variable.

10. The robot according to claim 9, wherein:

the controller determines whether there is not the identification information and the flag indicates a non-applicability, and interlinks the memory area for the parameter applied when there is not the identification information and the flag indicates the non-applicability with the variable.

11. The robot according to claim 1, wherein:

the work tool is an electric screw driver fastening a screw with a different screw length for each of the points; and the variable is contained in the instruction sequence in such a way that the screw length is substituted in the variable.

* * * * *